United States Patent
Agrawal et al.

(10) Patent No.: US 11,151,469 B2
(45) Date of Patent: Oct. 19, 2021

(54) PRIVACY RISK METRICS IN LOCATION BASED SERVICES

(71) Applicant: International Business Machines Corporation, Armonk, NY (US)

(72) Inventors: Dakshi Agrawal, Monsey, NY (US); Raghu K. Ganti, Elmsford, NY (US); Mudhakar Srivatsa, White Plains, NY (US); Jingjing Wang, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 15/375,647

(22) Filed: Dec. 12, 2016

(65) Prior Publication Data

US 2017/0091643 A1    Mar. 30, 2017

Related U.S. Application Data

(63) Continuation of application No. 13/921,750, filed on Jun. 19, 2013, now Pat. No. 9,547,845.

(51) Int. Cl.
*G06N 7/00*    (2006.01)
*H04L 29/06*    (2006.01)
(Continued)

(52) U.S. Cl.
CPC .............. *G06N 7/005* (2013.01); *G06F 21/00* (2013.01); *G06Q 10/107* (2013.01); *H04L 63/04* (2013.01);
(Continued)

(58) Field of Classification Search
CPC ...... G06N 5/047; G06N 99/005; G06N 5/046; G06N 5/02; G06N 20/00; G06F 17/30985
(Continued)

(56) References Cited

U.S. PATENT DOCUMENTS 6,253,146 B1 * 6/2001 Hanson .............. G01C 21/3415
340/905
8,612,134 B2 * 12/2013 Zheng ..................... G01S 19/14
701/400

(Continued)

FOREIGN PATENT DOCUMENTS

WO    WO-2011066468 A1 *    6/2011    ......... G01C 21/3617
WO    WO-2012054533 A1 *    4/2012    ......... G01C 21/3469

OTHER PUBLICATIONS

J. Robert Kennedy, Jr.—"Solving Unweighted and Weighted Bipartite Matching Problems in Theory and Practice"—1995—http://i.stanford.edu/pub/cstr/reports/cs/tr/95/1556/CS-TR-95-1556.pdf (Year: 1995).*

(Continued)

*Primary Examiner* — Viker A Lamardo
(74) *Attorney, Agent, or Firm* — Scully, Scott, Murphy & Presser, P.C.; Jeffrey S. LaBaw, Esq.

(57) ABSTRACT

The present disclosure relates generally to mechanisms for the estimation of location privacy risk, comprising: building one or more trajectory models from auxiliary information (e.g., one or more maps, one or more routes); capturing common behavioral patterns (e.g., shortest route(s),/fastest route(s)); identifying, given unlinked trajectories for a plurality of users, most likely linkages using the trajectory model(s); eliminating one or more unlikely linkages based on deviation from the shortest route(s) and/or the fastest route(s); measuring privacy as the percentage of linkages correctly identified; and outputting the measured privacy.

19 Claims, 9 Drawing Sheets

(51) Int. Cl.
  *H04W 12/02* (2009.01)
  *G06F 21/00* (2013.01)
  *G06Q 10/10* (2012.01)

(52) U.S. Cl.
  CPC ..... *H04W 12/02* (2013.01); *G06F 2221/2111* (2013.01)

(58) Field of Classification Search
  USPC .......................................................... 706/48
  See application file for complete search history.

(56) References Cited

U.S. PATENT DOCUMENTS

| | | | | |
|---|---|---|---|---|
| 9,547,845 | B2* | 1/2017 | Agrawal | G06Q 10/107 |
| 2003/0014654 | A1* | 1/2003 | Adler | G06F 21/6245 |
| | | | | 726/6 |
| 2008/0198159 | A1* | 8/2008 | Liu | G08B 13/19641 |
| | | | | 345/420 |
| 2011/0218833 | A1* | 9/2011 | Boss | G06Q 10/06316 |
| | | | | 705/7.26 |
| 2011/0246606 | A1* | 10/2011 | Barbeau | H04W 4/023 |
| | | | | 709/217 |
| 2012/0115505 | A1* | 5/2012 | Miyake | H04W 4/027 |
| | | | | 455/456.1 |
| 2014/0278032 | A1* | 9/2014 | Scofield | G01C 21/3492 |
| | | | | 701/118 |

OTHER PUBLICATIONS

Alexander Schrijver—"A Course in Combinatorial Optimization"—2004—http://www-users.math.umn.edu/~reiner/Classes/Schrijver2004.pdf (Year: 2004).*

Beresford et al.—"Mix zones: user privacy in location-aware services"—2004—https://ieeexplore.IEEE.org/document/1276918 (Year: 2004).*

Palanisamy et al.—"Location Privacy with Road Network Mix-Zones"—2012—https://ieeexplore.IEEE.org/document/6516475 (Year: 2012).*

Wang et al.—"Privacy-Aware Mobile Services over Road Networks"—2009—https://dl.acm.org/doi/pdf/10.14778/1687627.1687745 (Year: 2009).*

Alastair R. Beresford et al.—"Location privacy in ubiquitous computing"—2005—https://citeseerx.ist.psu.edu/viewdoc/download?doi=10.1.1.58.9671&rep=rep1&type=pdf (Year: 2005).*

Beresford et al., "Mix Zones: User Privacy in Location-aware Services", 2004, University of Cambridge, Cambridge, United Kingdom.

Liu et al., "Traffic-Aware Multiple Mix Zone Placement for Protecting Location Privacy", 2012 Proceedings IEEE INFOCOM, Gainesville, FL, pp. 972-980.

* cited by examiner

PRIVACY RISK METRICS IN LOCATION BASED SERVICES

This application is a continuation of U.S. patent application Ser. No. 13/921,750, filed Jun. 19, 2013, the contents of which is incorporated by reference herein.

The present invention was made with Government support under Contract No.: W911NF-09-2-0053 awarded by Army Research Office. The Government has certain rights in this invention.

BACKGROUND

One conventional mechanism to control information release utilizes anonymization. Referring now to FIG. 1, a conventional Chaumian Mix mechanism is shown. As seen, digital mixes 101 and 103 create hard-to-trace communications using a chain of proxies such that an external observer will not be able to "link" output messages 105A, 105B and 105C to input messages 107A, 107B and 107C (that is, the digital mixes create "unlinkability"). Such mechanisms are typically used in anonymizing IP networks, such as Tor and Onion routing.

In recent years, privacy protection has become a critical issue for location based services (sometimes referred to herein as "LBS") users. For example, a massive volume of spatio-temporal data is available that potentially reveals user habits, interests and activities (and which can be exploited for illicit gain via theft, blackmail or even physical violence).

Several studies show how to help protect users by anonymizing location traces, i.e., data that captures a sequence of space-time points visited by the users. Referring, for example, to *Mix Zones: User Privacy in Location-aware Services*, Laboratory for Communication Engineering, University of Cambridge, Beresford et al., a set of users {a, b, c} enter a mix-zone at time t (t is not an "instant", it is a "time window"). The same set of users leave the mix-zone at time t but with different pseudo-identifiers (e.g., {a, b, c}→{q, r, s}). The goal is to ensure that entering and exiting users cannot be "linked".

However, "side-channels" (e.g., timing channel, social side-channel, local spatial constraints (Markovian)) have been used in the past as auxiliary information to deanonymize data (that is, where anonymized data+auxiliary information=deanonymized data).

One specific conventional mechanism has examined linkages that can be deduced using timing information heuristics such as left/right turn (in the United States you drive on the right hand side of the road, so a left turn takes more time).

As mentioned above, utilizing mix-zones to break trajectories into unlinkable segments can help increase privacy significantly. However, conventional models typically assume that attackers use timing analysis and/or local factors (e.g., on roads in the United States a right turn is typically faster than a left turn). As described herein, many of these conventional assumptions are inadequate; and they may result in an over-estimation of privacy.

SUMMARY

The present disclosure relates generally to the field of privacy risk metrics (e.g., loss of privacy metrics) in location based services.

In various embodiments, methodologies may be provided that automatically determine privacy risk metrics in location based services.

In one embodiment, a method implemented in a computer system for estimating location privacy risk to a plurality people is provided, the method comprising: building, with the computer, at least one trajectory model; obtaining, with the computer, at least one behavioral pattern associated with the plurality of people; obtaining, with the computer, a plurality of unlinked trajectories associated with the plurality of people, wherein the plurality of unlinked trajectories span across a plurality of mix-zones; identifying with the computer, based upon the plurality of unlinked trajectories, a plurality of linkages by using the trajectory model; indicating, with the computer, as unlikely at least one of the linkages based upon deviation from the behavior pattern; measuring, with the computer, privacy as a percentage of the number of the linkages indicated as unlikely relative to the number of identified linkages; and outputting, with the computer, the measured privacy.

In another embodiment, a computer readable storage medium, tangibly embodying a program of instructions executable by the computer for estimating location privacy risk to a plurality people is provided, the program of instructions, when executing, performing the following steps: building at least one trajectory model; obtaining at least one behavioral pattern associated with the plurality of people; obtaining a plurality of unlinked trajectories associated with the plurality of people, wherein the plurality of unlinked trajectories span across a plurality of mix-zones; identifying, based upon the plurality of unlinked trajectories, a plurality of linkages by using the trajectory model; indicating as unlikely at least one of the linkages based upon deviation from the behavior pattern; measuring privacy as a percentage of the number of the linkages indicated as unlikely relative to the number of identified linkages; and outputting the measured privacy.

In another embodiment, a computer-implemented system for estimating location privacy risk to a plurality people is provided, the system comprising: a building element configured to build at least one trajectory model; a first obtaining element configured to obtain at least one behavioral pattern associated with the plurality of people; a second obtaining element configured to obtain a plurality of unlinked trajectories associated with the plurality of people, wherein the plurality of unlinked trajectories span across a plurality of mix-zones; an identifying element configured to identify, based upon the plurality of unlinked trajectories, a plurality of linkages by using the trajectory model; an indicating element configured to indicate as unlikely at least one of the linkages based upon deviation from the behavior pattern; a measuring element configured to measure privacy as a percentage of the number of the linkages indicated as unlikely relative to the number of identified linkages; and an outputting element configured to output the measured privacy.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

As described herein, determination (e.g., via calculation) of privacy risk metrics in location based services may be implemented in the form of systems, methods and/or algorithms.

In one example, determination of privacy risk metrics in location based services may be implemented via use of spatial trajectories on road networks as a side-channel.

For the purposes of describing and claiming the present invention the term "behavioral pattern" is intended to refer to an indication of one or more actions typically taken by one or more people. Such a behavioral pattern may include one or more actual preferences of a person and/or one or more actions that a person takes in view of circumstances.

For the purposes of describing and claiming the present invention the term "mix-zone" is intended to refer to a point, surface (2-dimemsions) or space (3-dimensional) in which one identity (e.g., one person's identity) is mixed with other identities (e.g., the identities of one or more other person or persons).

For the purposes of describing and claiming the present invention the term "trajectory model" is intended to refer to a (sub-) sequence of space-time boxes traversed by an entity. Space-time box is an extension of space-time point which allows for uncertainty in both the spatial and time dimensions (e.g., an uncertain point in space is represented by a space box, an uncertain point in time is represented by a time interval).

For the purposes of describing and claiming the present invention the term "unlinked trajectories" is intended to refer to breaking a trajectory of entity into two or more sub-trajectories and associating each sub-trajectory with a different user pseudonym.

For the purposes of describing and claiming the present invention the term "linkages" is intended to refer to a method of fusing two more unlinked trajectories (typically, each unlinked trajectory has a different pseudonym and the total number of pseudonyms>>number of entities) into end-to-end trajectories traversed by one or more entities.

As discussed herein, conventional methods typically underestimate privacy loss in the context of LBS. In particular, certain conventional methods consider privacy loss due to a single mix-zone and assume that the interactions across mix-zones are uncorrelated.

In contrast, various embodiments utilize correlations that span across multiple mix-zones (e.g., wherein such correlations are due to various user preferences).

Figure 3:
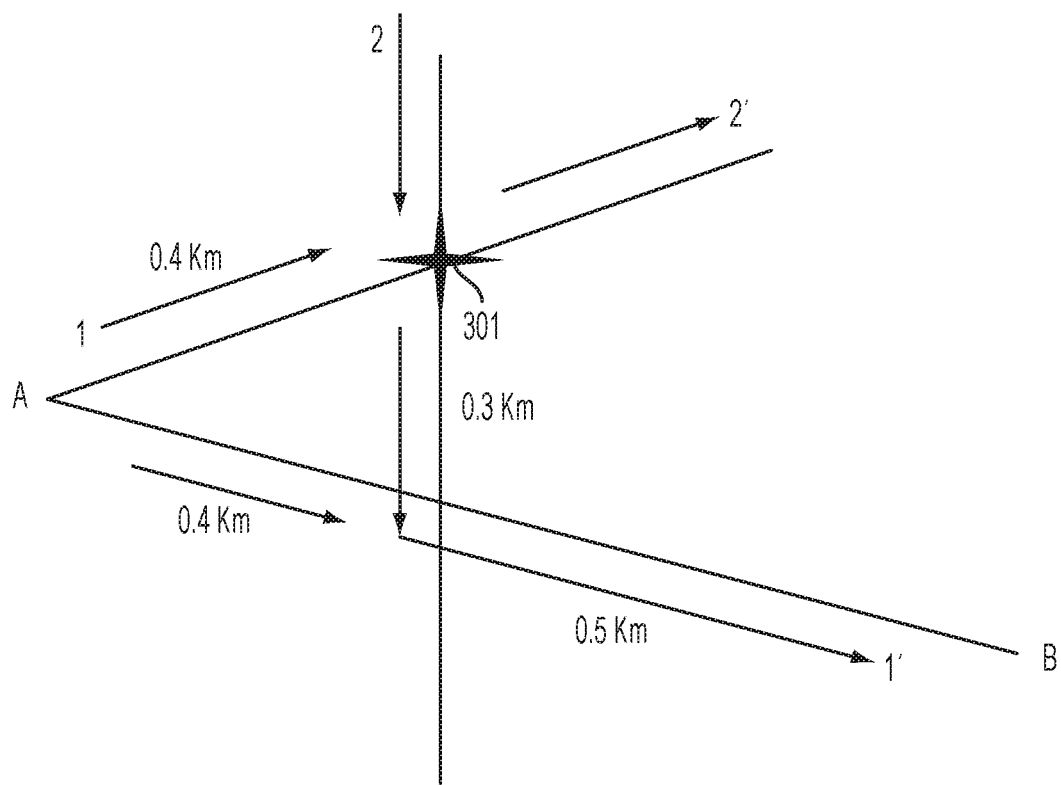
FIG. 3 depicts a diagram using spatial information according to an embodiment of the present invention.

Referring now to FIG. 3, an example implementation according to an embodiment will be described. In this example implementation, spatial information is used. For example, users will typically travel based on shortest/fastest routes (which introduces correlations over a sequence of mix-zones). In the specific example of FIG. 3, two users {1, 2} enter and two users {1', 2'} leave the mix-zone 301. Can {1, 2} be linked to {1', 2'}? For the purposes of this example, the hypothesis is that 1≠1' since a user who travels from A to B will take a shorter path than that indicated by the arrows. In this case, by elimination, 1=2' and 2=1'. This information cannot conventionally be deduced in this manner using timing information alone.

In view of the above, a new privacy risk metric that accounts for such non-local user preferences (as opposed to, for example, preferences that are local to one mix-zone) is disclosed herein. Accounting for such user preferences significantly impacts quantification of privacy.

Reference will now be made to an example attack model using weighted bipartite matching according to one embodiment. In this example: (a) there is a mix-zone Z; (b) $I_1, I_2, \ldots I_N$ are the ingress pseudonyms and $E_1, E_2, \ldots E_N$ are the egress pseudonyms; (c) $P_i$ is the probability of the $i^{th}$ mapping between all the ingress pseudonyms and egress pseudonyms; and (d) each mapping can be represented by a permutation of $[1, 2, \ldots, N]$: $[m_1^i, m_2^i, \ldots m_N^i]$.

Figure 1:
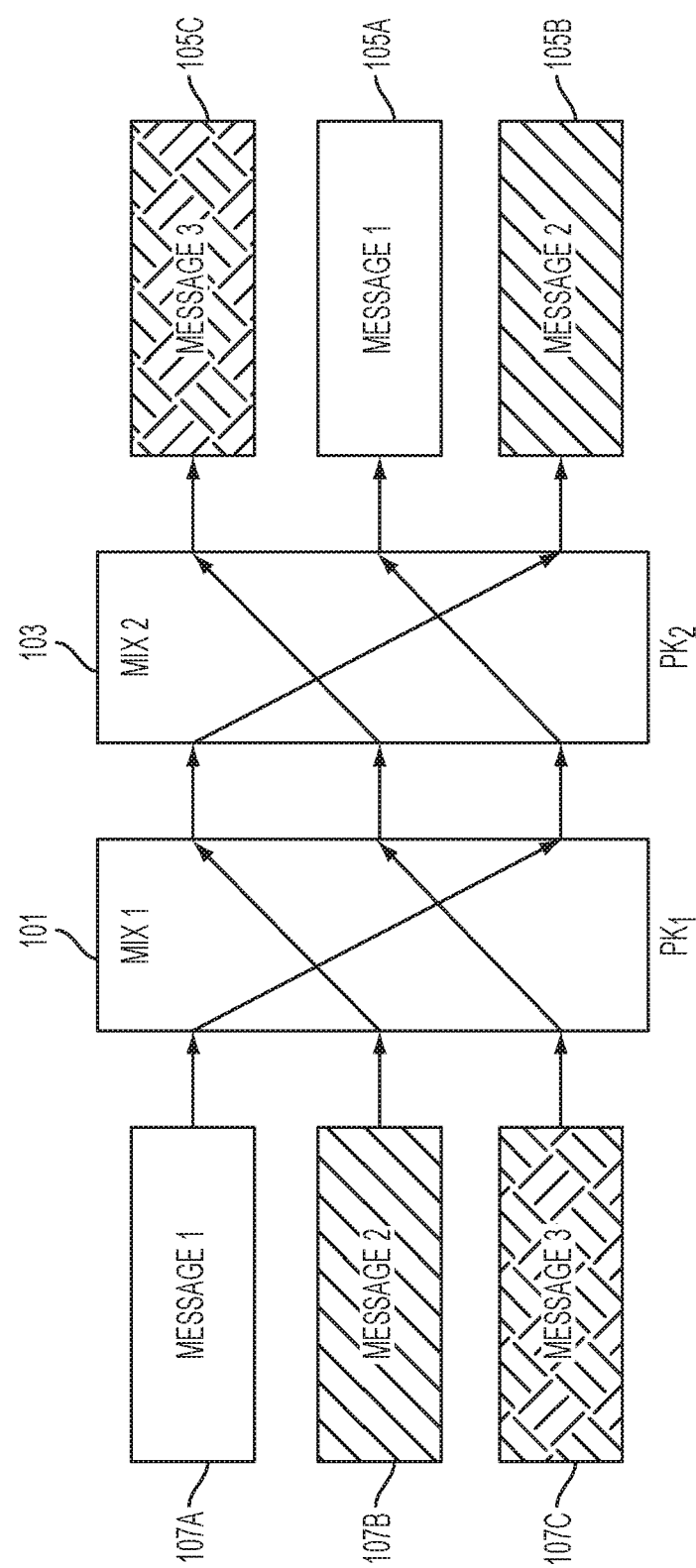
FIG. 1 depicts a block diagram of a conventional Chaumian Mix mechanism.
Figure 2:
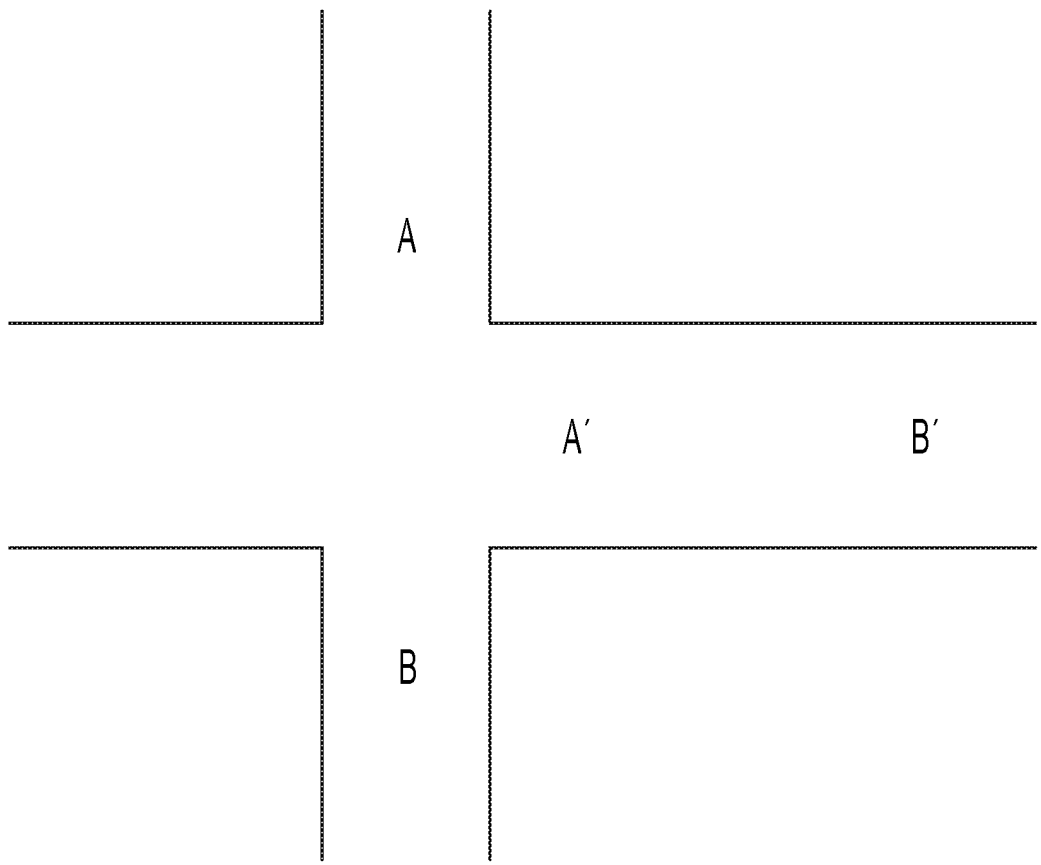
FIG. 2 depicts a diagram related to weighting according to an embodiment of the present invention.
Figures 4A, 4B:
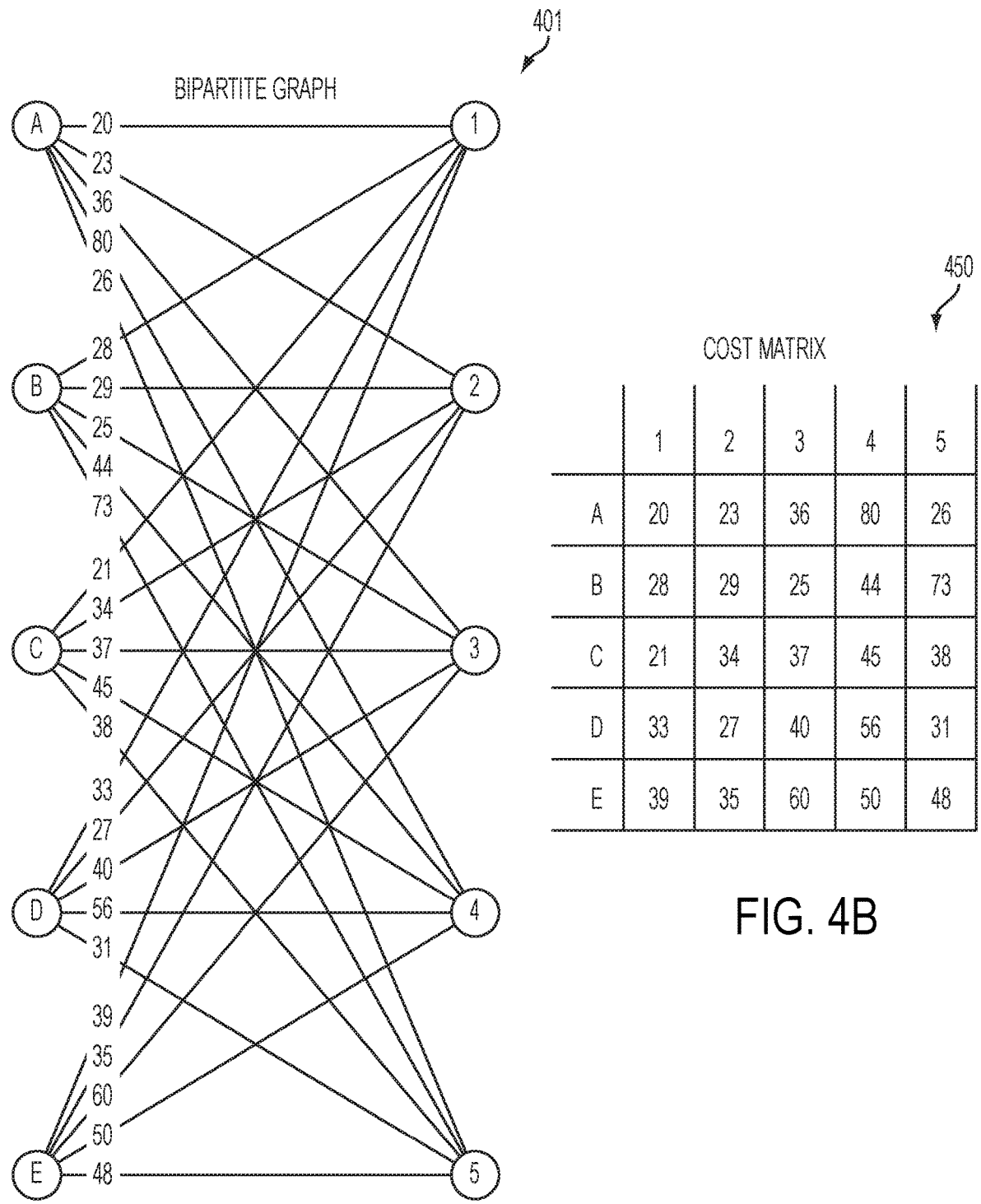
FIGS. 4A and 4B depict, respectively, an example bipartite graph and an example cost matrix according to an embodiment of the present invention.

Still referring to the example attack model, and with specific reference to FIGS. 4A and 4B, the process may perform maximum matching in weighted bipartite graph 401, wherein: (a) The vertices are ingress and egress pseudonyms; (b) Edge weights (see cost matrix 450) model the log conditional probability that the egress pseudonym represents the same underlying person as the ingress person; (c) the mapping which satisfies maximum matching in the weighted bipartite graph is the best result the attacker can get. In one specific example, the weight can take into account various factors such as "free right turns in USA", "intersection between a large road and a small road incurs larger waiting time for entities traversing the small road", etc. For example, consider two entities A and B arrive at an intersection (as shown in FIG. 2) at the same point in time. The intersection serves as a mix zone and two entities B' and A' leave the mix-zone in that order (i.e., at a future time B' is further down the road than A'). Given the "free right turn" assumption one might set up edge weights such that Pr(B=B')=0.8 (because B took a right turn) and is thus more likely to have gone further down the road than A.

Figure 5:
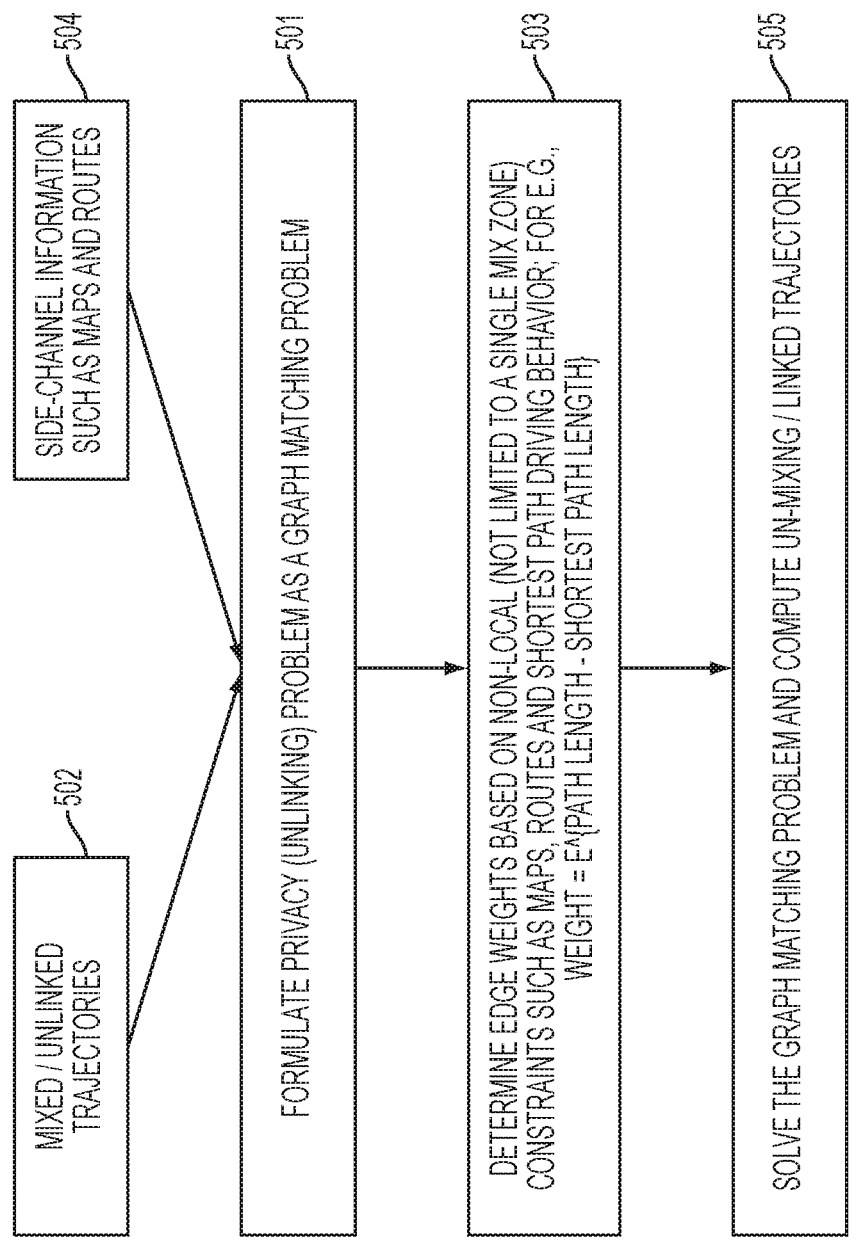
FIG. 5 depicts a block diagram of a method according to an embodiment of the present invention.

Referring now to FIG. 5, an example implementation according to another embodiment will be described. As seen in this FIG. 5, the implementation of this embodiment comprises: at 501—Formulate privacy (unlinking) problem as a graph matching problem (the formulation may utilize Mixed/unlinked trajectories 502 and Side-channel information 504 (such as maps and routes)); at 503—Determine edge weights based on non-local (not limited to a single mix-zone) constraints such as maps, routes and shortest path driving behavior; for e.g., weight=e^{shortest path length−path length} (in this example, the longer the path length (with respect to the shortest path length) the lower the weight); and at 505—Solve the graph matching problem and compute Un-mixing/linked trajectories. With reference now additionally to FIG. 3, assuming, for example, that we map entity 1 to 1' then the length of the path traversed by that entity is 0.4+0.3+0.5=1.2 Km, while that of the shortest path is 0.4+0.5=0.9 Km (see the "bottom" path). In this case the weight of a potential mapping from 1 to 1' is computed as e^{0.9-1.2}=e^{-0.3}≈0.741. On the other hand, a potential mapping from entity 1 to 2' has a weight of e^{0}=1, i.e., the mapping 1 to 2' is more likely that mapping 1 to 1'.

Figure 6:
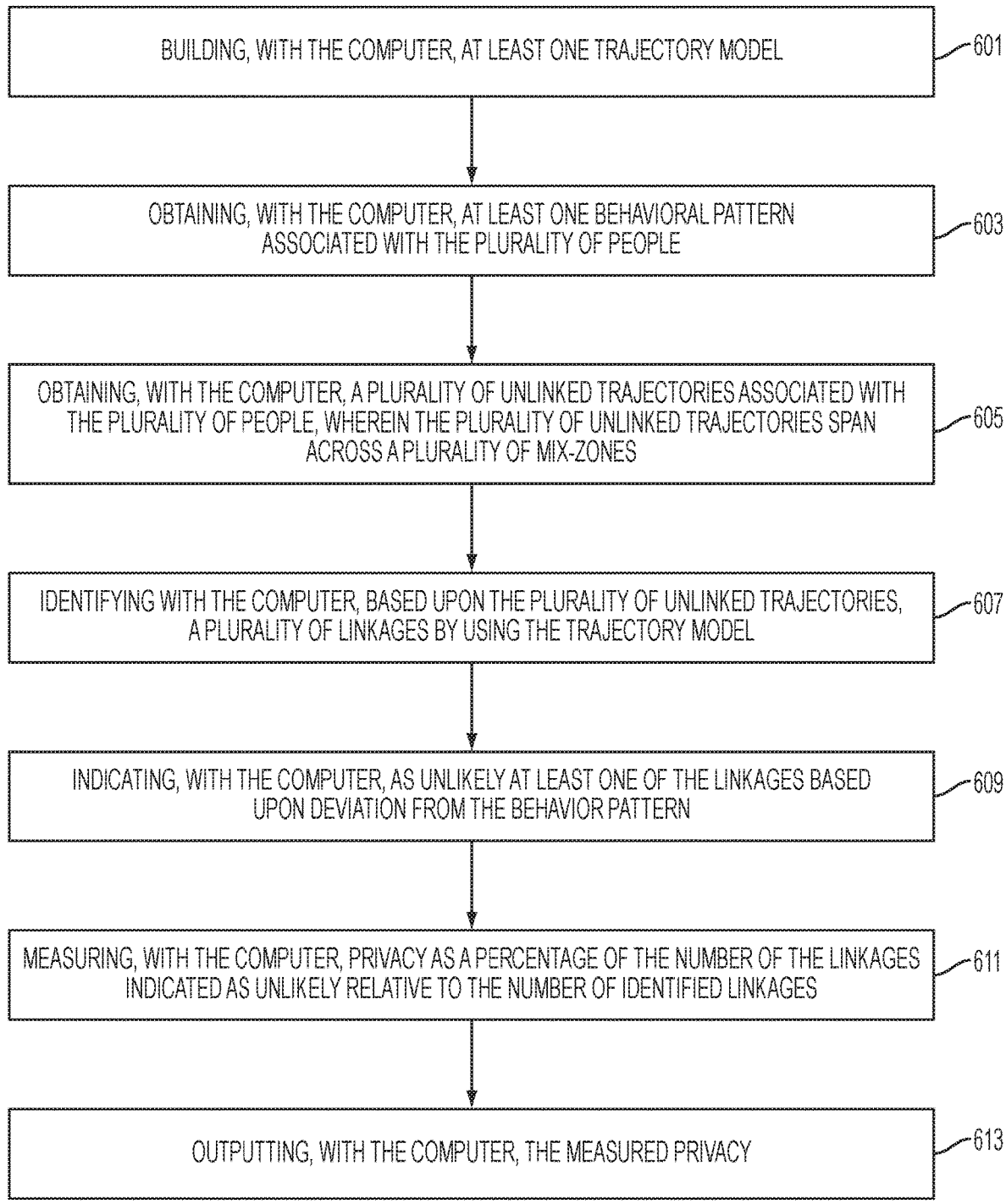
FIG. 6 depicts a block diagram of a method according to an embodiment of the present invention.

Referring now to FIG. 6, a method implemented in a computer system for estimating location privacy risk to a plurality people is shown. As seen in this FIG. 6, the method of this embodiment comprises: at 601—building, with the computer, at least one trajectory model; at 603—obtaining, with the computer, at least one behavioral pattern associated with the plurality of people; at 605—obtaining, with the computer, a plurality of unlinked trajectories associated with the plurality of people, wherein the plurality of unlinked trajectories span across a plurality of mix-zones; at 607—identifying with the computer, based upon the plurality of unlinked trajectories, a plurality of linkages by using the trajectory model; at 609—indicating, with the computer, as unlikely at least one of the linkages based upon deviation from the behavior pattern; at 611—measuring, with the computer, privacy as a percentage of the number of the linkages indicated as unlikely relative to the number of identified linkages; and at 613—outputting, with the computer, the measured privacy. With reference to another example, a bipartite graph is constructed with one partition including entities {1, 2} and the second partition including entities {1', 2'}. The edge weights on this bipartite graph are as follows: w(1, 1')=0.741, w(1, 2')=w(2, 1'), w(2, 2')=1. Hence, the solution to the maximal weighted bipartite graph matching problem yields the following mappings {(1, 2'), (2, 1')}.

In one example, any steps may be carried out in the order recited or the steps may be carried out in another order.

Figure 7:
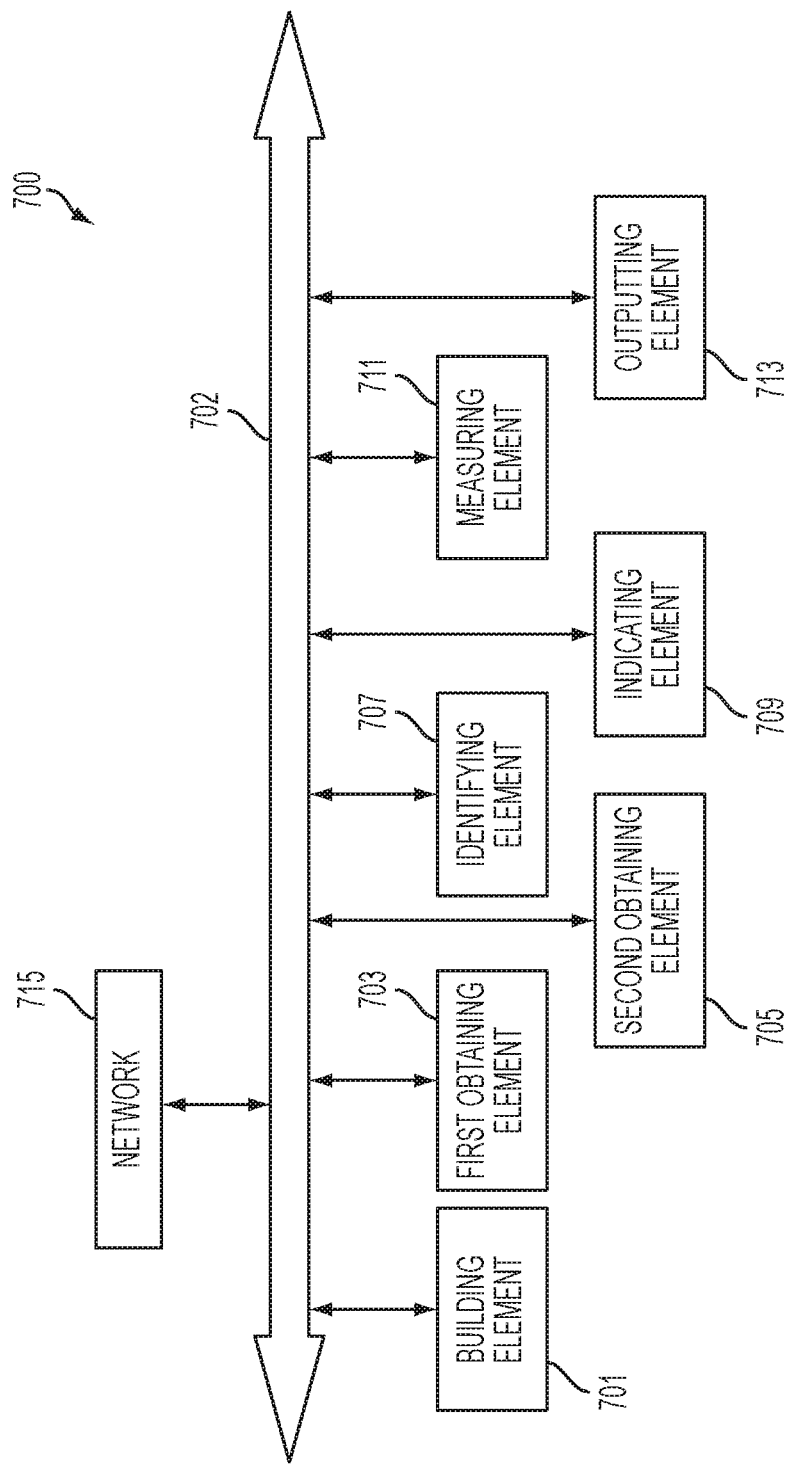
FIG. 7 depicts a block diagram of a system according to an embodiment of the present invention.

Referring now to FIG. 7, in another embodiment, a system 700 for estimating location privacy risk to a plurality people is provided. This system may include the following elements: a building element 701 configured to build at least one trajectory model; a first obtaining element 703 configured to obtain at least one behavioral pattern associated with the plurality of people; a second obtaining element 705 configured to obtain a plurality of unlinked trajectories associated with the plurality of people, wherein the plurality of unlinked trajectories span across a plurality of mix-zones; an identifying element 707 configured to identify, based upon the plurality of unlinked trajectories, a plurality of linkages by using the trajectory model; an indicating element 709 configured to indicate as unlikely at least one of the linkages based upon deviation from the behavior pattern; a measuring element 711 configured to measure privacy as a percentage of the number of the linkages indicated as unlikely relative to the number of identified linkages; and an outputting element 713 configured to output the measured privacy.

Still referring to FIG. 7, each of the elements may be operatively connected together via system bus 702. In one example, communication between and among the various elements may be bi-directional. In another example, communication may be carried out via network 715 (e.g., the Internet, an intranet, a local area network, a wide area network and/or any other desired communication channel(s)). In another example, some or all of these elements may be implemented in a computer system of the type shown in FIG. 9.

Reference will now be made to testing that was performed. This testing utilized two data sets: Synthetic Data and Real San Francisco Taxicab Data.

The Synthetic Data was as follows: (a) Map: road network over the bounding box defined by lat/long coordinates (31.2068,121.4446); (31.2668,121.5046); (b) Trajectories: 3000 randomly chosen trajectories within 3 minutes. In one example, "busy" junctions on the road network may be picked as mix-zones.

The Real San Francisco Taxicab Data was as follows: (a) Map: San Francisco(SF) area; (b) SF taxicab data (10,000 trajectories). In one example, "busy" junctions on the road network may be picked as mix-zones.

Figure 8:
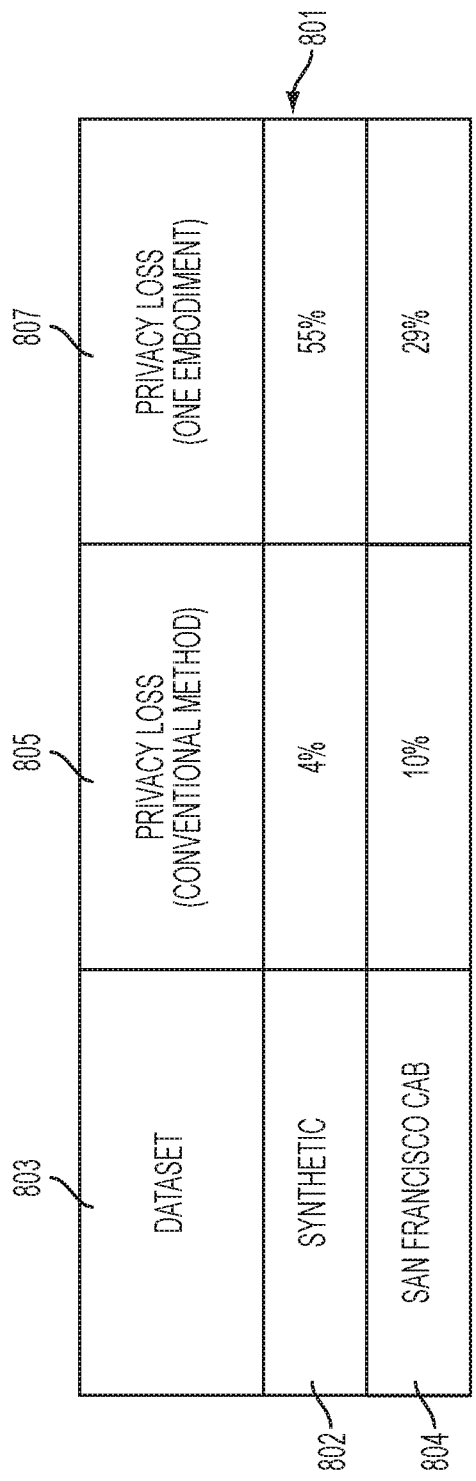
FIG. 8 depicts a table of comparison privacy loss measurement according to an embodiment of the present invention.

Referring now to FIG. 8, a table 801 of key results of the testing described above is depicted. As seen in this table, column 803 relates to the dataset used (Synthetic, in row 802; San Francisco Cab, in row 804); column 805 relates to the calculated privacy loss using a conventional method; and column 807 relates to the calculated privacy loss according to one embodiment.

Still referring to FIG. 8, it is noted that the conventional mechanism underestimated privacy loss by not considering spatial information (i.e., the conventional mechanism overestimates location privacy). Even assuming the time dimension gives zero information (i.e., it is perfectly private) the spatial dimension (based on shortest paths that are generally preferred by drivers) reveals significant information. In particular, it is seen in this empirical study that lack of consideration of non-local user preferences can result in significant errors (e.g., privacy loss measure of 5% vs. 45%). Further, it is noted that the synthetic data randomly picks entry/exit points, thus, has more diversity and less privacy (more diversity implies that entities may be uniquely identifiable and thus this translates to less privacy).

Reference will now be made to a number of theoretical results associated with a conventional mechanism and an example embodiment. More particularly, a maximal loss in privacy is one (i.e., there exist situations wherein the conventional mechanism's estimation of privacy is arbitrarily weak). For example, a road network can be constructed wherein a conventional mechanism links no more than O(poly(d)/d!) entry/exit points (d is the node in-degree (and out-degree) of the mix zone). In contrast, an example embodiment can link all of the entry/exit points: maximal separation is $1-O(poly(d)/d!) \to 1$ as $d \to \infty$. In this example, poly(d) denotes some polynomial in d, in comparison d! is exponential in d and hence, poly(d)/d! becomes arbitrarily close to zero as d increases.

Further, given a road network, the maximal loss in privacy has a lower bound $\lambda_1 + \lambda_2^2$ ($\lambda_i$ are eigenvalues of the weighted road network graph such that $\lambda_1 >= \lambda_2 >= \ldots >= \lambda_n$). The bound is tight for a regular network topology (each node has the same degree) or a tree topology (e.g., a star network).

Figure 9:
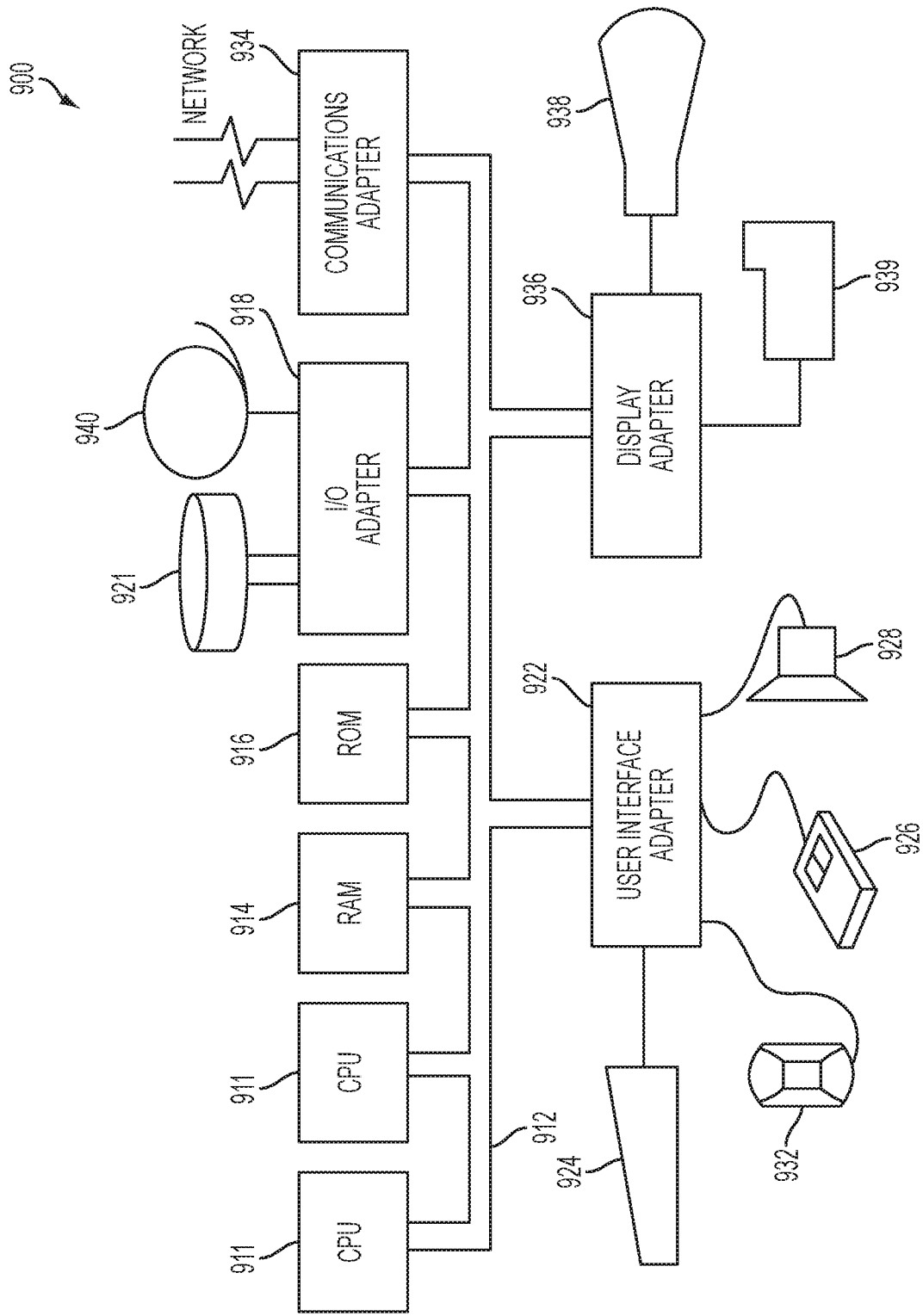
FIG. 9 depicts a block diagram of a system according to an embodiment of the present invention.

Referring now to FIG. 9, this figure shows a hardware configuration of computing system 900 according to an embodiment of the present invention. As seen, this hardware configuration has at least one processor or central processing unit (CPU) 911. The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communications adapter 934 for connecting the system 900 to a data processing network, the Internet, an Intranet, a local area network (LAN), etc., and a display adapter 936 for connecting the bus 912 to a display device 938 and/or printer 939 (e.g., a digital printer or the like).

In one embodiment, a method implemented in a computer system for estimating location privacy risk to a plurality people is provided, the method comprising: building, with the computer, at least one trajectory model; obtaining, with the computer, at least one behavioral pattern associated with the plurality of people; obtaining, with the computer, a plurality of unlinked trajectories associated with the plurality of people, wherein the plurality of unlinked trajectories span across a plurality of mix-zones; identifying with the computer, based upon the plurality of unlinked trajectories, a plurality of linkages by using the trajectory model; indicating, with the computer, as unlikely at least one of the linkages based upon deviation from the behavior pattern; measuring, with the computer, privacy as a percentage of the number of the linkages indicated as unlikely relative to the number of identified linkages; and outputting, with the computer, the measured privacy.

In one example, the trajectory model is built based upon at least one of: (a) one or more maps; (b) one or more routes; and (c) any combination thereof.

In another example, the method comprises building, with the computer, a plurality of trajectory models, wherein the identifying is performed by using the plurality of trajectory models.

In another example, the behavioral pattern comprises at least one of: (a) one or more shortest routes; (b) one or more fastest routes; and (c) any combination thereof.

In another example, the indicating comprises indicating as unlikely at least one of the linkages based on deviation from at least one of: (a) a shortest route; (b) a fastest route; and (c) any combination thereof.

In another example, the method comprises obtaining, with the computer, a plurality of behavioral patterns, wherein the indicating is performed by using the plurality of behavioral patterns.

In another example, the number of unlinked trajectories equals the number of people times the number of mix-zones.

In another example, at least one of the linkages is indicated as unlikely based on the deviation from the behavior pattern being above a threshold.

In another example, the outputting comprises at least one of: (a) an output to a computer monitor; (b) an output to a computer file; (c) a hardcopy output; and (d) any combination thereof.

In another embodiment, a computer readable storage medium, tangibly embodying a program of instructions executable by the computer for estimating location privacy risk to a plurality people is provided, the program of instructions, when executing, performing the following steps: building at least one trajectory model; obtaining at least one behavioral pattern associated with the plurality of people; obtaining a plurality of unlinked trajectories associated with the plurality of people, wherein the plurality of unlinked trajectories span across a plurality of mix-zones; identifying, based upon the plurality of unlinked trajectories, a plurality of linkages by using the trajectory model; indicating as unlikely at least one of the linkages based upon deviation from the behavior pattern; measuring privacy as a percentage of the number of the linkages indicated as unlikely relative to the number of identified linkages; and outputting the measured privacy.

In one example, the trajectory model is built based upon at least one of: (a) one or more maps; (b) one or more routes; and (c) any combination thereof.

In another example, the program of instructions, when executing, further performs building a plurality of trajectory models, wherein the identifying is performed by using the plurality of trajectory models.

In another example, the behavioral pattern comprises at least one of: (a) one or more shortest routes; (b) one or more fastest routes; and (c) any combination thereof.

In another example, the indicating as unlikely comprises indicating at least one of the linkages based on deviation from at least one of: (a) a shortest route; (b) a fastest route; and (c) any combination thereof.

In another example, the program of instructions, when executing, further performs obtaining a plurality of behavioral patterns, wherein the indicating is performed by using the plurality of behavioral patterns.

In another embodiment, a computer-implemented system for estimating location privacy risk to a plurality people is provided, the system comprising: a building element configured to build at least one trajectory model; a first obtaining element configured to obtain at least one behavioral pattern associated with the plurality of people; a second obtaining element configured to obtain a plurality of unlinked trajectories associated with the plurality of people, wherein the plurality of unlinked trajectories span across a plurality of mix-zones; an identifying element configured to identify, based upon the plurality of unlinked trajectories, a plurality of linkages by using the trajectory model; an indicating element configured to indicate as unlikely at least one of the linkages based upon deviation from the behavior pattern; a measuring element configured to measure privacy as a percentage of the number of the linkages indicated as unlikely relative to the number of identified linkages; and an outputting element configured to output the measured privacy.

In one example, the trajectory model is built based upon at least one of: (a) one or more maps; (b) one or more routes; and (c) any combination thereof.

In another example, the building element is configured to build a plurality of trajectory models, wherein the identifying is performed by using the plurality of trajectory models.

In another example, the behavioral pattern comprises at least one of: (a) one or more shortest routes; (b) one or more fastest routes; and (c) any combination thereof.

In another example, the indicating element is configured to indicate at least one of the linkages as unlikely based on deviation from at least one of: (a) a shortest route; (b) a fastest route; and (c) any combination thereof.

In other examples, any steps described herein may be carried out in any appropriate desired order.

As described herein, various embodiments may operate in the context of mobile and wireless networking.

As described herein, various embodiments may operate in the context of: Smarter Planet: Cities; Smarter Planet: Transportation; Software: Information and data management; Web Technology: Wireless.

In various examples, there may be a trade-off between privacy and service satisfaction, such as: (a) Service interruption due to mix-zones; and/or (b) Quality of traffic monitoring with the existence of mix-zones.

In other embodiments, mechanisms may be provided to enhance driving directions (e.g., GPS driving directions) to take privacy into account (that is, privacy aware routes).

As described herein, various embodiments may quantify the loss in location privacy due to auxiliary spatial information.

As described herein, various embodiments may handle noise (e.g., close to shortest paths). In one specific example, edge weights are designed as $e^{\{shortest\ path\ length - path\ length\}}$ which gracefully decreases as path length starts becoming longer than the shortest path length. This makes the model robust to entities traversing close to optimal paths; only when the path traversed significantly deviates from the shortest path the edge weight assigned becomes very small.

As described herein are mechanisms for computing a privacy risk metric of sensitive location information in anonymized (e.g., mixed) trajectories.

As described herein are mechanisms for computing a privacy risk metric that considers non-local user preferences based on correlations spanning across multiple mix-zones (as opposed, for example, to considering each mix-zone in isolation). In one specific example, global user preferences (e.g., shortest path routing, fastest path routing) are considered when determining the privacy metric.

In another embodiment, mechanisms may provide for the estimation of risk to, for example, a location data seller when the seller sells data collected from a plurality of end users.

In another embodiment, mechanisms may provide for the estimation of risk to, for example, a location data seller when the seller sells data within a marketplace for the trading of data collected from a plurality of end users.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method implemented in a computer system for estimating location privacy risk to a plurality people, the method comprising:
    building, with the computer, at least one trajectory model;
    obtaining, with the computer, at least one behavioral pattern associated with the plurality of people;
    forming, with the computer, a weighted bipartite graph-matching problem using a weighted bipartite graph having vertices modeling ingress and egress pseudonyms based upon a plurality of unlinked trajectories associated with the plurality of people, wherein the plurality of unlinked trajectories comprises at least one of: shortest routes, fastest routes or combinations thereof spanning across a plurality of mix-zones and said edge weights assigned according to shortest path routing;
    solving, with the computer, the weighted bipartite graph-matching problem to identify a plurality of linkages by using the trajectory model;
    indicating, with the computer, as unlikely at least one of the plurality of linkages based upon deviation from the behavior pattern;
    measuring, with the computer, privacy as a percentage of the number of the linkages indicated as unlikely relative to the number of identified linkages; and
    designing, using the computer, a road network to have one or more mix zones, each mix zone having entry points and exit points and a plurality of linkages that link entry points and exit points based on the measured privacy, each said plurality of linkages of a mix zone of the road network accounting for a person's ability to make right turns, a person's shortest path driving behavior, and a presence of a road intersection between a large road and a small road.

2. The method of claim 1, wherein the trajectory model is built based upon at least one of: (a) one or more maps; (b) one or more routes; and (c) any combination thereof.

3. The method of claim 1, comprising building, with the computer, a plurality of trajectory models, wherein the identifying is performed by using the plurality of trajectory models.

4. The method of claim 1, wherein the behavioral pattern comprises at least one of: (a) one or more shortest routes; (b) one or more fastest routes; and (c) any combination thereof.

5. The method of claim 4, wherein the indicating comprises indicating as unlikely at least one of the linkages based on deviation from at least one of: (a) a shortest route; (b) a fastest route; and (c) any combination thereof.

6. The method of claim 1, comprising obtaining, with the computer, a plurality of behavioral patterns, wherein the indicating is performed by using the plurality of behavioral patterns.

7. The method of claim 1, wherein the number of unlinked trajectories equals the number of people times the number of mix-zones.

8. The method of claim 1, wherein at least one of the linkages is indicated as unlikely based on the deviation from the behavior pattern being above a threshold.

9. A non-transitory computer readable storage medium, tangibly embodying a program of instructions executable by the computer for estimating location privacy risk to a plurality people, the program of instructions, when executing, performing the following steps:
    building at least one trajectory model;
    obtaining at least one behavioral pattern associated with the plurality of people;
    forming a weighted bipartite graph-matching problem using a weighted bipartite graph having vertices modeling ingress and egress pseudonyms based upon a plurality of unlinked trajectories associated with the plurality of people, wherein the plurality of unlinked trajectories comprises at least one of: shortest routes, fastest routes and combinations thereof spanning across a plurality of mix-zones and said edge weights assigned according to shortest path routing;
    solving the weighted bipartite graph-matching problem to identify a plurality of linkages by using the trajectory model;
    indicating as unlikely at least one of the plurality of linkages based upon deviation from the behavior pattern;
    measuring privacy as a percentage of the number of the linkages indicated as unlikely relative to the number of identified linkages; and
    designing a road network having one or more mix zones, each mix zone having entry points and exit points and a plurality of linkages that link entry points and exit points based on the measured privacy, each said plurality of linkages of a mix zone of the road network accounting for a person's ability to make right turns, a person's shortest path driving behavior, and a presence of a road intersection between a large road and a small road.

10. The computer readable storage medium of claim 9, wherein the trajectory model is built based upon at least one of: (a) one or more maps; (b) one or more routes; and (c) any combination thereof.

11. The computer readable storage medium of claim 9, wherein the program of instructions, when executing, further performs building a plurality of trajectory models, wherein the identifying is performed by using the plurality of trajectory models.

12. The computer readable storage medium of claim 9, wherein the behavioral pattern comprises at least one of: (a) one or more shortest routes; (b) one or more fastest routes; and (c) any combination thereof.

13. The computer readable storage medium of claim 12, wherein the indicating as unlikely comprises indicating at least one of the linkages based on deviation from at least one of: (a) a shortest route; (b) a fastest route; and (c) any combination thereof.

14. The computer readable storage medium of claim 9, wherein the program of instructions, when executing, further performs obtaining a plurality of behavioral patterns, wherein the indicating is performed by using the plurality of behavioral patterns.

15. A computer-implemented system for estimating location privacy risk to a plurality people, the system comprising:

a memory for storing instructions;
a hardware processor coupled to said memory for receiving said stored instructions and in response, configuring the hardware processor to;
build at least one trajectory model;
obtain at least one behavioral pattern associated with the plurality of people;
form a weighted bipartite graph-matching problem using a weighted bipartite graph having vertices modeling ingress and egress pseudonyms based upon a plurality of unlinked trajectories associated with the plurality of people, wherein the plurality of unlinked trajectories comprises at least one of: shortest routes, fastest routes and combinations thereof spanning across a plurality of mix-zones and said edge weights assigned according to shortest path routing;
solve the weighted bipartite graph-matching problem to identify a plurality of linkages by using the trajectory model;
indicate as unlikely at least one of the plurality of linkages based upon deviation from the behavior pattern;
measure privacy as a percentage of the number of the linkages indicated as unlikely relative to the number of identified linkages; and
design a road network having one or more mix zones, each mix zone having entry points and exit points and a plurality of linkages that link entry points and exit points based on the measured privacy, each said plurality of linkages of a mix zone of the road network accounting for a person's ability to make right turns, a person's shortest path driving behavior, and a presence of a road intersection between a large road and a small road.

16. The system of claim 15, wherein the trajectory model is built based upon at least one of: (a) one or more maps; (b) one or more routes; and (c) any combination thereof.

17. The system of claim 15, wherein to build the at least one trajectory model, said hardware processor is further configured to build a plurality of trajectory models, wherein the identifying is performed by using the plurality of trajectory models.

18. The system of claim 15, wherein the behavioral pattern comprises at least one of: (a) one or more shortest routes; (b) one or more fastest routes; and (c) any combination thereof.

19. The system of claim 15, wherein to indicate as unlikely at least one of the linkages, the hardware processor is further configured to indicate at least one of the linkages as unlikely based on deviation from at least one of: (a) a shortest route; (b) a fastest route; and (c) any combination thereof.

* * * * *